Aug. 30, 1966   L. G. WILDE   3,270,347
DISPLAY MARKING APPARATUS
Filed May 11, 1964   3 Sheets-Sheet 3

INVENTOR.
LEON G. WILDE
BY
*Philip J. McFarland*
ATTORNEY

United States Patent Office 3,270,347
Patented August 30, 1966

3,270,347
DISPLAY MARKING APPARATUS
Leon G. Wilde, Andover, Mass., assignor to Laboratory for Electronics, Inc., Boston, Mass., a corporation of Delaware
Filed May 11, 1964, Ser. No. 366,376
6 Claims. (Cl. 346—8)

This invention pertains generally to display apparatus and particularly to apparatus of such type which is adapted to plotting the position of a moving vehicle, as an aircraft.

Many types of display apparatus are presently in use to provide a visual record of the position, or ground track, of an aircraft. Among such apparatus are those which, for convenience, may be designated as "electromechanical plotters." Generally, such a plotter comprises: means for holding a chart and a marking device, as a stylus; means for moving the chart and the stylus relative to one another so that the stylus, when actuated, moves into contact with the chart to make a mark thereon indicating the position of the aircraft; and, means for periodically actuating the stylus. Thus, a series of marks in the form of "dots" are made on the chart indicating the ground track of the aircraft. The mark last formed, of course, represents the present position of the aircraft.

It has been recognized that electromechanical plotters of the type just referred to are not ideally suited to use in aircraft, even though, perforce, such plotters have been rather widely accepted. First of all, the stylus and its appurtenant supporting and actuating means often causes important position indicating marks or topographical features on the chart to be obscured, thus detracting from the value of the plotter. Further, the relative complexity of the supporting and actuating means required for a stylus makes the plotter susceptible to failure in the adverse environmental conditions encountered in airborne applications.

Therefore, it is a primary object of this invention to provide an improved electromechanical plotter wherein marks indicating the position of a moving vehicle are printed on a chart.

Another object of this invention is to provide an improved electromechanical plotter wherein a relatively small marking device is used so that a minimum amount of a chart is obscured.

Still another object of this invention is to provide an improved electromechanical plotter which meets the foregoing objects with a light, simple and rugged marking device.

Another object of this invention is to provide an improved electromechanical plotter which is also adapted to displaying the heading of an aircraft.

These and other objects of this invention are attained generally in an electromechanical plotter wherein a chart is moved beneath an inked ribbon so that when a movable marking device (which may also be oriented in accordance with the heading of the vehicle whose position is being plotted) is periodically actuated, the position of the vehicle is marked on the chart. The marking device also bears a rotatable indicium which follows the heading of the vehicle so that the heading of the vehicle is always shown. For a more complete understanding of my inventive concepts, reference is now made to the following detailed description of a preferred embodiment of my invention as illustrated in the drawings, in which:

Figure 1:
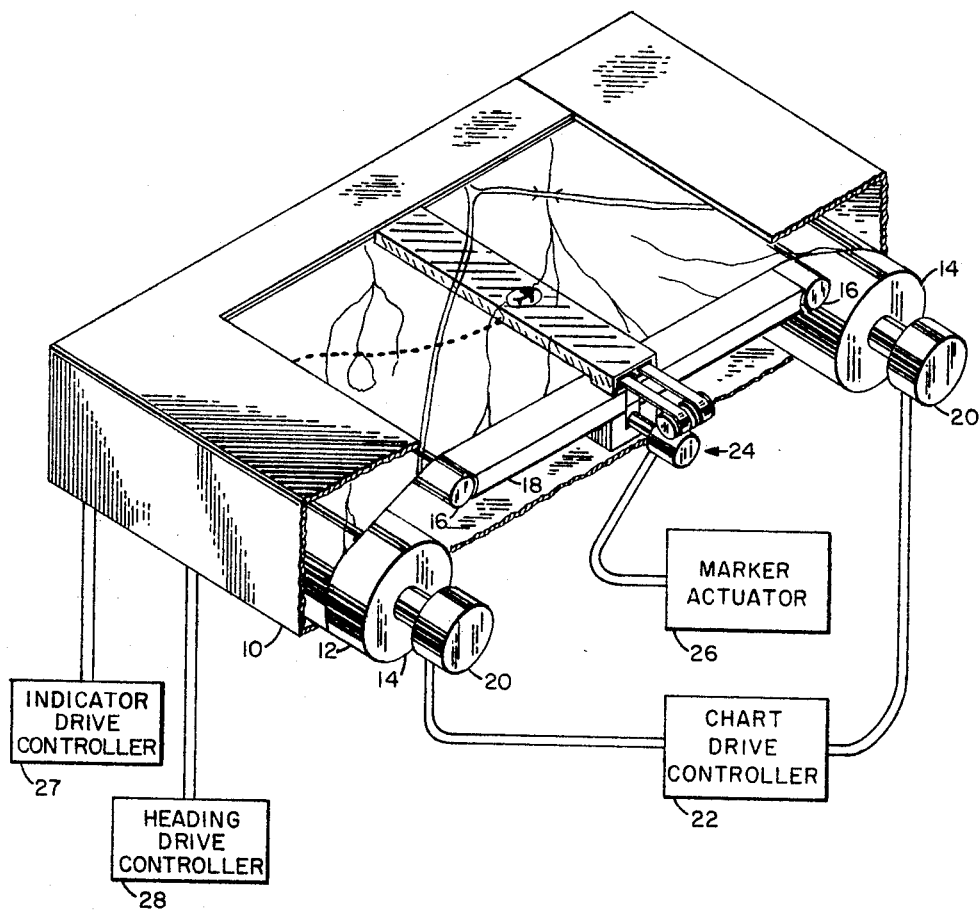
FIG. 1 is an isometric view, partially broken away the better to show details and somewhat simplified for convenience of explanation, of an electromechanical plotter according to my invention.

Referring now to FIG. 1 it may be seen that an electromechanical plotter according to a preferred embodiment of this invention is contained in a case 10 having a rectangular opening (not numbered) formed therein. A chart 12 (which, of course, is not, per se, a part of this invention) is mounted on spools 14 within the case 10. The chart 12 is led over guide rollers 16 and a platen 18 having a transverse slot (not numbered). The spools 14 are driven by motors 20 under the control of a conventional chart drive controller 22. A printing and indicating assembly 24 (which assembly is described in more detail hereinafter) is disposed as shown. A conventional marker actuator 26, indicator drive controller 27 and heading drive controller 28 complete the preferred embodiment of my invention.

Figure 2:
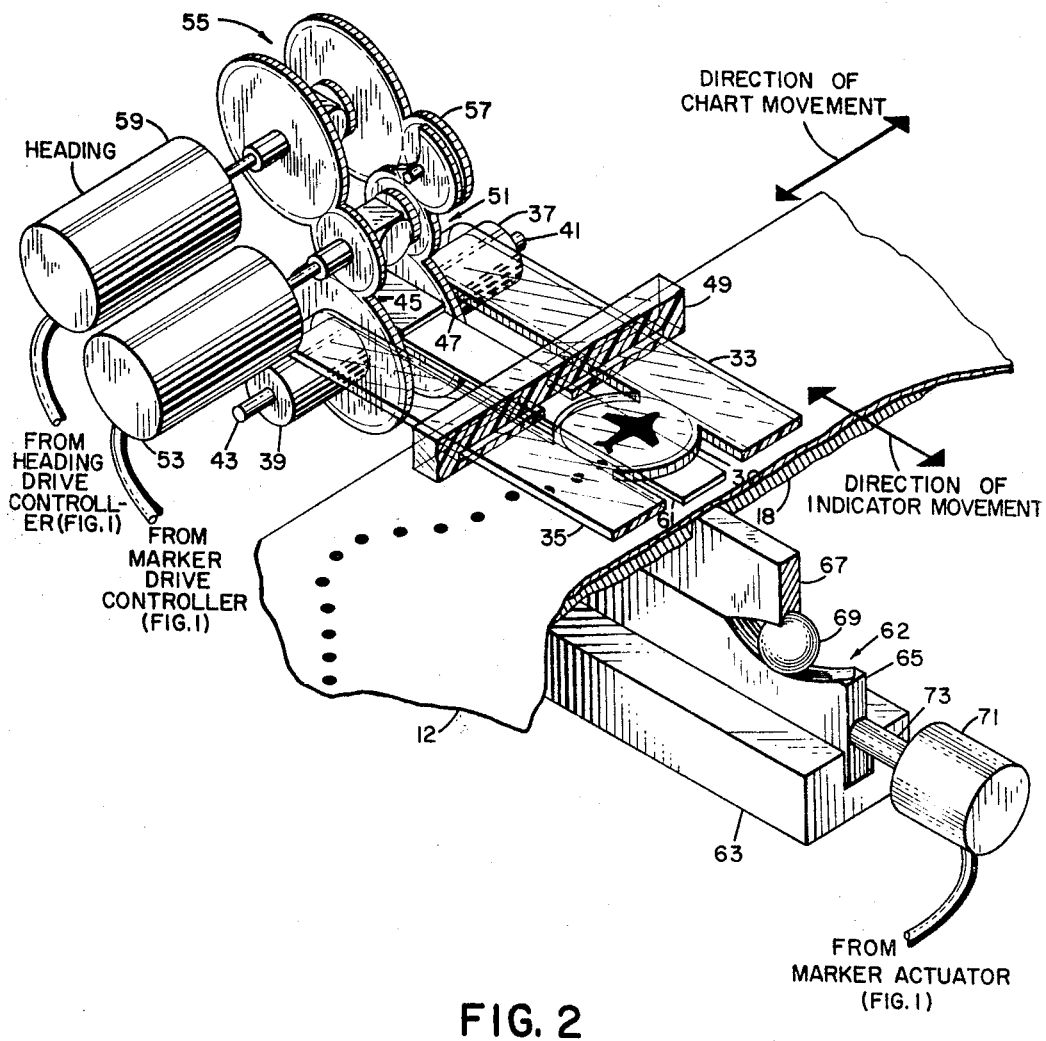
FIG. 2 is a partial view showing in more detail a portion of the structure of FIG. 1.
Figure 3A:
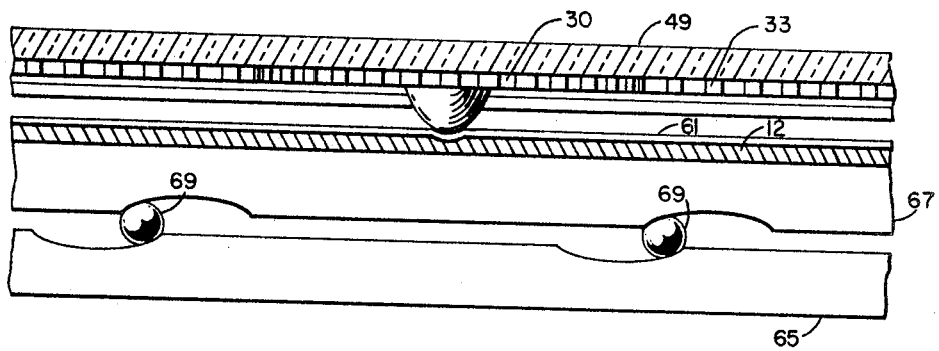
FIG. 3A and FIG. 3B are partial cross-sectional views showing particularly the manner in which the contemplated marking means operates.
Figure 3B:
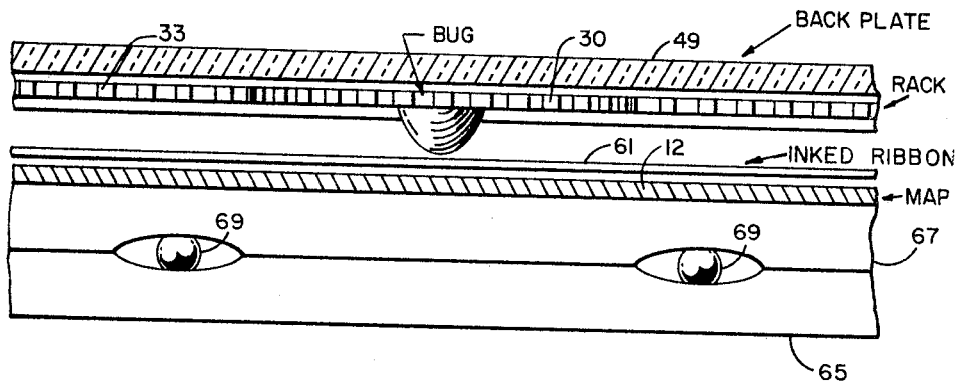

Referring now to FIGS. 2, 3A and 3B, it may be seen that the printing and indicating assembly 24 performs three separate but related operations. Firstly, such assembly provides for transverse movement of an indicator 30 as indicated. Such movement, in combination with movement of the chart 12, positions the indicator 30 over the proper point on the chart 12 so that present position of the vehicle may be observed and plotted. Secondly, the printing and indicating assembly provides for rotational movement of the indicator 30 superposed on the transverse movement thereof so that an indicium 31 (here shown as an outline of an aircraft) gives a visual representation of the heading of the vehicle. Thirdly, the printing and indicating assembly 24 provides for periodically marking the position of the vehicle on the chart 12 so that a record of its ground track is made, as shown by the series of dots (unnumbered) on the chart 12 in FIGS. 1 and 2.

The indicator 30 preferably is fabricated from a transparent material, as "Mylar," generally in the form of a disc (unnumbered) having gear teeth formed around its periphery. A depending marking projection (shown in FIGS. 3A and 3B) may be formed integrally with the disc during the molding operation. The outline of indicium 31 may also be formed during the molding operation and then colored as desired. The gear teeth on the disc mate with gear teeth on racks 33, 35 as shown. The racks 33, 35 preferably are molded from the same transparent material as the indicator 30. The ends of the racks 33, 35 are secured to capstans 37, 39 which in turn are affixed, respectively, to shafts 41, 43. The last named elements are colinearly mounted in any convenient manner (not shown) so as to be independently driven. Gears 45, 47 are affixed to the shafts 41, 43 so that the capstans 37, 39 may be driven in a manner to be described. It should be noted here in passing that the racks 33, 35 are affixed also to independently mounted capstans (unnumbered) shown in FIG. 1. The latter are conventional spring-loaded takeup devices and will not be described in detail. It may be seen from the foregoing that, when the gears 45, 47 are rotated in the same direction, the racks 33, 35 may be caused to move together, thus moving the indicator 30 transversely of the chart 12.

The disc portion of the indicator and the racks 33, 35 are held at a substantially fixed distance above the platen 18. This is accomplished by threading the racks 33, 35 through a member 49 (having a T-shaped slot as shown in FIG. 2) and slipping the indicator 30 into the same slot. The member 49, in turn, is spaced from the platen 18 by standoffs (not numbered) as shown in FIG. 1. In order to drive the capstan 37, 39 in the same direction, the gears 45, 47 are meshed with a conventional differential mechanism 51. When the last mechanism is actuated, as by a motor 53 which, in turn, is responsive to a signal from the indicator drive controller 27, the gears 45, 47 are driven in the same direction. Consequently, there is no relative movement between the racks 33, 35 and the indicator 30 is moved, in the T-shaped slot of the member 49, transversely of the chart 12.

An additional differential mechanism 55, a reversing gear 57, and a heading drive motor 59 cooperate with the just-described mechanism to provide rotational movement of the indicator 30 in accordance with changes in heading of the vehicle. Thus, when the heading drive motor is energized by a signal out of the heading drive controller 28 of FIG. 1, the output gears of the differential mechanism 55 are caused to move in the same direction. One of these gears is meshed directly with the differential mechanism 51 while the second is meshed thereto through the reversing gear 57. It follows, then, that when the motor 59 is energized the gear train operates so as to move the capstans 37, 39 in opposite directions. Such movement, in turn, causes relative movement between the racks 33, 35 so that the indicator 30 is rotated.

The third function of the printing and indicating assembly 24, that is, periodic marking of the position of the vehicle, is accomplished by the remaining elements in FIG. 2 in the manner shown in FIGS. 3A and 3B. The elements just referred to are an inked ribbon 61 (clamped in any convenient manner overlying the chart 12) and a printing assembly 62. The latter assembly, in turn, comprises a slotted base member 63 (mounted in any convenient manner beneath the transverse slot in the platen 18), a marker print actuator bar 65 slidably mounted in the slot in the base member 63, a marker print bar 67 movably mounted in the transverse slot in the platen 18, and at least two ball bearings 69 captured in complementary shaped indentations in the opposing surfaces of the marker print actuator bar 65 and the marker print bar 67. The plunger (not shown) of a conventional solenoid 71 is affixed as by a connecting shaft 73 to the marker print actuator bar 65. When the solenoid 71 is de-energized, the elements of the printing assembly 62 are in the relative positions shown in FIG. 3B. It is evident, therefore, that the chart 12 and the indicator 30 may be moved as desired without interference from any part of the printing assembly 62. When, however, the solenoid 71 is energized (as by completion of an electric circuit in the marker actuator 26 by means of a motor driven cam actuated switch), the plunger of the solenoid 71 moves and the marker print actuator bar 65 follows the movement of such plunger. The movement of the marker print actuator bar 65 is converted, through the ball bearings 69, into a movement of the marker print bar 67 toward the indicator 30, as shown in FIG. 3A. The movement of the marker print bar 67, in turn, moves the chart 12 upwardly so that the inked ribbon 61 is wedged between the depending marking projection of the indicator 30 and the chart 12. This wedging action, in turn, results in a mark being formed on the chart 12.

Although the illustrated and described embodiment of my invention is preferred, it will be immediately apparent to those having skill in the art that many changes and modifications may be made without departing from my inventive concepts. For example, it is not essential that the printing assembly be arranged in the illustrated manner. That is, the marker print actuator bar and the marker print bar may be disposed above the indicator so that the latter may be pressed down to make the desired mark. Obviously, in such a case, the platen would be a solid member. In addition, the shape of the opposing surfaces and the manner in which the lateral motion of the marker print actuator bar is converted to movement of the marker print bar toward and away from the chart need not be as illustrated. Any arrangement by means of which the substantially linear lateral motion of the marker print actuator bar may be mechanically converted to a printing stroke of the marker print bar may be used. Still further, it is obvious that back lighting of the chart may be incorporated in a plotter according to this invention. In such a case, obviously, the inked tape could easily be placed under the chart. It is felt, therefore, that the invention should not be restricted to its illustrated and described embodiment, but rather should be limited only by the spirit and scope of the appended claims.

What is claimed is:
1. Apparatus for plotting the position of a vehicle on a chart, comprising:
 (a) a platen over which a chart to be marked may be movably disposed, the platen having a transverse opening formed therein;
 (b) a bar disposed in the transverse opening and movably mounted to project beyond the surface of the platen adjacent to the chart;
 (c) an inked ribbon overlying the chart;
 (d) a marker overlying the inked ribbon at a substantially fixed distance above the surface of the platen underlying the chart;
 (e) means for moving the chart and the marker with respect to each other to position the marker over the chart in accordance with the position of the vehicle; and
 (f) means for periodically moving the bar beyond the surface of the platen to cause the marker to transfer ink from the inked ribbon to the chart to mark the position of the vehicle.
2. Apparatus as in claim 1 wherein:
 (a) the marker includes an indicium indicating the heading of the vehicle; and
 (b) the means for moving the chart and the marker with respect to each other includes further means for rotating the marker to cause the indicium to move in accordance with changes in the heading of the vehicle.
3. Apparatus for indicating the position and heading of a vehicle on a chart, comprising:
 (a) means, including a platen having a transverse aperture formed therein, for supporting a chart in an extended position;
 (b) means for moving the chart in a direction perpendicular to the transverse aperture in accordance with the movement of the vehicle in one coordinate;
 (c) a marker having a disc-like portion bearing an indicium corresponding to the heading of the vehicle, the peripheral portion of such disc-like portion being formed into gear teeth, the marker further having a depending marking projection;
 (d) a supporting member having a T-shaped slot formed therein affixed to the platen and overlying the transverse aperture, the disc-like portion of the marker and the depending marking projection being movably mounted in the T-shaped slot;
 (e) a first and a second rack movably mounted in the T-shaped slot and meshing with the teeth on the peripheral portion of the disc-like portion of the marker at diametrically opposite points thereon;
 (f) means for moving the first and the second rack simultaneously in a direction parallel to the transverse aperture in accordance with the movement of the vehicle in a second coordinate orthogonal to the first coordinate;
 (g) means for moving the first and the second rack in opposite directions in accordance with changes in the heading of the vehicle;
 (h) an inked ribbon interposed between the chart and the depending marking projection; and
 (i) means, operative through the transverse aperture in the platen periodically to move the chart into contact with the inked ribbon to cause the depending marking projection to print a mark indicative of the position of the vehicle.
4. Apparatus as in claim 3 wherein the last named means comprises

(a) a print bar having at least two formed indentations on its lower surface;
(b) a print actuator bar having at least two complementary formed indentations normally disposed opposite the indentations in the print bar;
(c) a member rotatably disposed in each of the formed indentations;
(d) a solenoid having its plunger connected to the print actuator bar; and,
(e) means for periodically actuating the solenoid to move the print actuator bar in a direction parallel to the transverse slot, and the member to rotate in the formed indentations, thereby finally causing the print bar to move the chart into contact with the inked ribbon.

5. Apparatus for plotting the position of a vehicle on a chart and for indicating the heading of such vehicle, comprising:
(a) means for moving a chart and a marker orthogonally with respect to each other to move the marker into a position over the chart corresponding to the position of the vehicle;
(b) a circular indicator conntected to said marker for orthogonal movement therewith to indicate the heading of the vehicle;
(c) means for rotating said indicator about an axis extending through the marker and at right angles to the chart to cause said indicator to assume an angular position representing the heading of the vehicle in conjunction with its position along a track;
(d) said means to rotate said indicator including at least one linearly movable bar disposed in engagement with the periphery of said indicator; and,
(e) means for intermittently moving the chart and the marker toward and away from each other to make marks on the chart indicative of the track of the vehicle.

6. Apparatus as defined in claim 5 wherein said circular indicator includes a plurality of teeth disposed around the periphery thereof and said rotating means includes two moveable bars each having a plurality of teeth along at least one edge adapted to cooperate with said teeth disposed around the periphery of said circular indicator, said movable bars being positioned on opposite sides of said circular indicator to impart both translational and rotational movement to said circular indicator.

References Cited by the Examiner

UNITED STATES PATENTS

| 353,606 | 11/1886 | Stupakoff | 100—291 |
| 3,145,070 | 8/1964 | Miller et al. | 346—29 |

FOREIGN PATENTS 915,164   1/1963   Great Britain.

RICHARD B. WILKINSON, *Primary Examiner.*

LOUIS J. CAPOZI, *Examiner.*

JOSEPH W. HARTARY, *Assistant Examiner.*